United States Patent
Okubo et al.

(10) Patent No.: US 6,940,892 B2
(45) Date of Patent: Sep. 6, 2005

(54) SPREAD SPECTRUM TRANSMISSION APPARATUS, SPREAD SPECTRUM RECEPTION APPARATUS, AND SPREAD SPECTRUM COMMUNICATION SYSTEM

(75) Inventors: Seiji Okubo, Tokyo (JP); Tatsuya Uchiki, Tokyo (JP); Toshiharu Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 646 days.

(21) Appl. No.: 10/096,850

(22) Filed: Mar. 14, 2002

(65) Prior Publication Data

US 2002/0176486 A1 Nov. 28, 2002

(30) Foreign Application Priority Data

May 17, 2001 (JP) .................................. 2001-148393

(51) Int. Cl.[7] .............................................. H04B 1/69
(52) U.S. Cl. ..................... 375/130; 375/146; 375/147; 375/239; 332/112; 329/313
(58) Field of Search .................... 375/130, 140, 375/146, 147, 239; 332/112; 329/313

(56) References Cited

U.S. PATENT DOCUMENTS 6,041,074 A * 3/2000 Nakamura ................ 375/142
6,205,169 B1 * 3/2001 Nakamura ................ 375/152
6,728,298 B1 * 4/2004 Okubo et al. ............. 375/146

FOREIGN PATENT DOCUMENTS

JP   HEI 4-113732 A    4/1992

* cited by examiner

Primary Examiner—Temesghen Ghebretinsae
(74) Attorney, Agent, or Firm—Birch, Stewart, Kolasch & Birch, LLP

(57) ABSTRACT

A spread spectrum transmission apparatus includes, a chip clock generation section which outputs a chip clock in one frame formed of M+L−1 chips, a frame clock generation section which outputs a frame clock synchronized to frame occurrence timing, SS-PPM signal generation sections each of which inserts a pseudonoise code sequence corresponding to one period from some of M chips located at a head of a frame based on K-bit transmission data and generates an SS-PPM signal, delay sections which respectively delay N SS-PPM signals respectively by determined delay quantities, and a multiplexing section which adds up all of outputs respectively of the delay units and generates a multiplexed SS-PPM signal.

10 Claims, 13 Drawing Sheets

($\alpha_1=0$, $\alpha_2=\pi/4$, $\alpha_3=\pi/2$, $\alpha_4=3\pi/4$)

SPREAD SPECTRUM TRANSMISSION APPARATUS, SPREAD SPECTRUM RECEPTION APPARATUS, AND SPREAD SPECTRUM COMMUNICATION SYSTEM

FIELD OF THE INVENTION

The present invention relates to a spread spectrum transmission apparatus, a spread spectrum reception apparatus, and a spread spectrum communication system using a spread spectrum pulse position modulation communication scheme adopted in radio communication systems and radio LAN systems.

BACKGROUND OF THE INVENTION

In mobile communication systems of recent years, the spread spectrum (SS) communication schemes attract attention as one of transmission schemes of various media such as images, voices and data. In the spread spectrum communication schemes, there are included the direct sequence (DS) scheme and the frequency hopping (FH) scheme. Among them, the DS scheme is a scheme of multiplying an information signal directly by a pseudonoise code sequence having a band far wider than that of the information signal, thereby applying spread spectrum processing on the information signal, and conducting communication.

In the spread spectrum pulse position modulation (SS-PPM) communication scheme, which is one of the DS schemes, information data of a plurality of bits can be transmitted by one spread-spectrum signal, and consequently a higher information transmission speed can be implemented.

FIG. 12 is a block diagram showing a configuration of a spread spectrum transmission apparatus used in the conventional spread spectrum pulse position modulation communication scheme. FIG. 13 is a diagram showing a frame structure used in the conventional spread spectrum pulse position modulation communication scheme. FIG. 14 is a block diagram showing a configuration example of a spread spectrum reception apparatus used in the conventional spread spectrum pulse position modulation communication scheme. By the way, the conventional art examples of FIGS. 12 and 13 have been quoted from Japanese Patent Application Laid-Open Publication No. 4-113732 entitled "Spread spectrum pulse position modulation communication scheme."

As shown in FIG. 12, a spread spectrum transmission apparatus used in the conventional spread spectrum pulse position modulation communication scheme includes a clock signal generator 801, a modulo M+2L counter 802, an M+L−1 detector 803, a serial-parallel converter 804, a buffer 805, a frequency multiplier 806, a comparator 807, an OR gate 808, a pseudonoise signal generator (PN signal generator) 809, an oscillator 810, a modulator 811, a band pass filter (BPF) 812, and an antenna 813.

First, by referring to FIG. 13, a frame structure using the conventional spread spectrum pulse position modulation communication scheme will now be explained. As shown in FIG. 13, one frame is formed of M+2L slots. L is the length (the number of chips) of a pseudonoise code sequence (PN code). M is the number of pulse position information pieces (the number of chips) of spread spectrum pulses (SS pulses) corresponding to an information content to be inserted in one frame and transmitted. One slot length is equal to one chip of the pseudonoise code sequence.

Operation will now be explained. With reference to FIG. 12, the clock signal generator 801 generates a clock having a clock rate which corresponds to the chip rate in the direct sequence scheme, and outputs the clock to the modulo M+2L counter 802 and the PN signal generator 809. The clock rate of the clock generated by the clock signal generator 801 is denoted by Rc.

The modulo M+2L counter 802 is a counter which counts from a value 0 to a value of M+2L−1. Its count value is denoted by C. The count value C of the modulo M+2L counter 802 is supplied to the M+L−1 detector 803 and the comparator 807.

In the case where the count value (C) of the modulo M+2L counter 802 is equal to the value of M+L−1, the M+L−1 detector 803 outputs a logic "1" to the buffer 805, the frequency multiplier 806, and the OR gate 808. The output frequency (the reciprocal) of the M+L−1 detector 803 is equal to the output frequency of the modulo M+2L counter 802. Therefore, its value becomes Rc/(M+2L). The value Rc/(M+2L) is denoted by Rf.

The frequency multiplier 806 multiplies the frequency of the output of the modulo (M+2L) counter 802 to K times, and outputs a resultant signal to the serial-parallel converter 804. K is the number of transmission bits per frame. A clock rate Rb of the frequency multiplier 806 is K times the frame rate Rf.

The serial-parallel converter 804 is typically formed of a K-bit shift register. Bit serial transmission data input to the serial-parallel converter 804 is sampled at timing of an output speed Rb. Therefore, the output speed Rb is called bit rate. An output (parallel data) of the serial-parallel converter 804 is supplied to the buffer 805.

The buffer 805 is a K-bit parallel-input, parallel-output register which samples the output signal of the serial-parallel converter 804 at timing of the frame rate Rf. The output of the buffer 805 is serial data input to the serial-parallel converter 804 and converted into a parallel form at aligned timing. This signal is called symbol, and a binary value of the output is denoted by S. The symbol can assume a total of M values. The output of the buffer 805 is supplied to the comparator 807.

When the relation C=S is satisfied, the comparator 807 outputs a logic "1" to the OR gate 808. S and C satisfy the relations $0 \leq S < M$ and $0 \leq C < M+2L$. The OR gate 808 combines the output signal of the M+L−1 detector 803 and the output signal of the comparator 807, and a resultant signal to the PN signal generator 809. The output signal of the M+L−1 detector 803 indicates the position of a frame synchronizing signal. The output signal of the comparator 807 indicates a position corresponding to the data symbol.

When a pulse has got on the output signal of the OR gate 808, the PN signal generator 809 generates a pseudonoise code sequence over L chips, and then outputs a "0." The oscillator 810 generates a sine wave signal having a carrier frequency fc. Outputs of the PN signal generator 809 and the oscillator 810 are supplied to the modulator 811.

The modulator 811 multiplies the output (the PN signal) of the PN signal generator 809 by the output (the carrier frequency signal) of the oscillator 810. An output signal of the modulator 811 is subject to filtering processing of removing undesired frequency components in the bandpass filter (BPF) 812, amplified suitably by a buffer amplifier or an output amplifier although not illustrated, and output from the antenna 813 as a radio wave. This transmission signal is denoted by tx.

As shown in FIG. 14, a spread spectrum reception apparatus used in the conventional spread spectrum pulse position communication scheme includes an antenna 901, an amplifier (AMP) 902, a modulator 903, an oscillator 904, a band pass filter (BPF) 905, an automatic gain control circuit (AGC) 906, a matched filter 907, a detection device 908, a frame synchronization circuit 909, a pulse position measurement circuit 910, and a parallel-serial converter 911.

Operation of the reception apparatus will now be explained. A received signal rx received by the antenna 901 is similar to the transmission signal tx except the transmission distortion and transmission delay. The received signal rx is amplified by the amplifier 902, converted to a signal of an intermediate frequency in the modulator 903 by using a local signal fed from the oscillator 904, subjected to signal bandwidth limiting processing in the bandpass filter (BPF) 905, and made a signal having a fixed level in the automatic gain control circuit (AGC) 906.

The signal output from the automatic gain control circuit (AGC) 906 is input to the matched filter 907. If there is an input which coincides with a pattern, the matched filter 907 outputs a signal of an intermediate frequency which corresponds to one chip section, in a pulse form. The detection device 908 conducts envelope detection on the signal output from the matched filter 907. An output of the detection device 908 is supplied to the frame synchronization circuit 909 and the pulse position measurement circuit 910.

The frame synchronization circuit 909 conducts frame synchronization on the basis of the output signal of the detection device 908, and outputs a frame synchronization pulse synchronized to frame periods to the pulse position measurement circuit 910. The pulse position measurement circuit 910 conducts pulse position demodulation by using the output signal of the detection device 908 and the frame synchronization pulse output from the frame synchronization circuit 909, and outputs a K-bit parallel demodulated data sequence to the parallel-serial converter 911. The parallel-serial converter 911 conducts parallel-serial conversion on the input K-bit parallel demodulated data sequence, and outputs one demodulated data sequence.

In the communication system using the conventional spread spectrum pulse position modulation communication scheme, a transmission speed tr represented by the following equation (1) is implemented by using the transmission apparatus shown in FIG. 12 and the reception apparatus shown in FIG. 14.

$$tr = \frac{\log_2 M}{(M+2L)} R_c \quad (1)$$

However, the conventional spread spectrum pulse position modulation communication scheme as described above has a problem that each user cannot conduct data communication faster than the transmission speed represented by the equation (1) when conducting data communication by using one pseudonoise code sequence per user.

Further, in the case where data communication is conducted by using a plurality of pseudonoise code sequences per user, data communication faster than the transmission speed represented by the equation (1) can be conducted. By doing so, however, there is a problem that the circuit scale of the transmission apparatus and the reception apparatus becomes large according to the number of pseudonoise code sequences in use.

The present invention has been achieved in order to solve the above problems. It is an object of this invention to provide a spread spectrum transmission apparatus, a spread spectrum reception apparatus, and a spread spectrum communication system using a spread spectrum pulse position communication scheme capable of conducting data communication faster than the transmission speed represented by the equation (1) by using one pseudonoise code sequence per user without making the circuit scale too large, and capable of having a favorable bit error rate characteristic even in the case where a received signal is subject to nonlinear amplification.

SUMMARY OF THE INVENTION

It is an object of the present invention to obtain a spread spectrum transmission apparatus comprising, a chip clock generation unit which outputs a chip clock having a clock rate corresponding to a chip rate in one frame formed of M+L−1 chips, the M+L−1 being determined by a pseudonoise code sequence having a period of L chips and M chips which represents a number of pulse position information pieces corresponding to an information content to be transmitted, a frame clock generation unit which conducts frequency division on the chip clock output by the chip clock generation unit with a factor of M+L−1, and outputs a frame clock synchronized to frame occurrence timing, N (where N is an integer of at least 2) spread spectrum pulse position modulated signal generation units each of which inserts the pseudonoise code sequence corresponding to one period from some of the M chips located at a head of a frame based on K-bit (where K is an integer of at least 2) transmission data by taking a rising edge of the frame clock output by the frame clock generation unit as a reference, and generates a spread spectrum pulse position modulated signal, N delay units which delay outputs respectively of the N spread spectrum pulse position modulated signal generation units by determined delay quantities $\{\tau_1 T_c, \tau_2 T_c, \tau_3 T_c, \ldots, \tau_N T_c\}$ (where delay factors $\{\tau_1, \tau_2, \tau_3, \ldots, \tau_N\}$ are integers which satisfy $0 \leq \tau_1, \tau_2, \tau_3, \ldots, \tau_N < L$, and $T_c$ is a chip period), and a multiplexing unit which adds up all of outputs respectively of the N delay units, and generates a multiplexed spread spectrum pulse position modulated signal.

According to the first aspect, a chip clock generation unit outputs a chip clock having a clock rate corresponding to a chip rate in one frame formed of (M+L−1) chips. A frame clock generation unit conducts frequency division on the chip clock with a factor of M+L−1, and outputs a frame clock synchronized to frame occurrence timing. Each of N spread spectrum pulse position modulated signal generation units operates in accordance with the chip clock, inserts the pseudonoise code sequence corresponding to one period from some of the M chips located at a head of a frame based on K-bit transmission data by taking a rising edge of the frame clock as a reference, and thereby generates a spread spectrum pulse position modulated signal in which one frame is formed of M+L−1 chips. The spread spectrum pulse position modulated signals of N channels thus generated are delayed in N delay units by determined delay quantities, and multiplexed by a multiplexing unit.

According to a second aspect of the present invention, there is provided a spread spectrum reception apparatus comprising, a matched filter which conducts correlation computation between a received signal and a pseudonoise code sequence and outputs a result of the computation as a correlation signal, one frame of the received signal being formed of M+L−1 chips determined by the pseudonoise code sequence having a period of L chips and M chips which represents a number of pulse position information pieces corresponding to an information content to be transmitted, a frame synchronization unit which outputs a reproduced frame clock synchronized to start timing of the frame based on the correlation signal, N (where N is an integer of at least 2) delay correction units which conduct delay correction so as to align start timing of the frames with respect to the correlation signal output by the matched filter, and N pulse position demodulation units which conduct pulse position demodulation by using N delay-corrected correlation signals output respectively by the N delay correction units and the reproduced frame clock, and output parallel demodulated data sequences each having K bits.

According to the second aspect, a matched filter conducts correlation computation between a received signal in which one frame is formed of M+L−1 chips and a pseudonoise code sequence identical to that of the transmission side, and outputs a correlation signal when pattern coincidence is found. The correlation signal is subjected in delay correction units to processing of correcting delays given on the transmission side. Pulse position demodulation is conducted in pulse position demodulation units. K-bit parallel demodulated data sequences of N channels are thus obtained.

According to a third aspect of the present invention, there is provided a spread spectrum communication system comprising, a spread spectrum transmission apparatus according to the first aspect which conducts delay processing on a frame formed of M+L−1 chips, multiplexes N (where N is an integer of at least 2) spread spectrum pulse position modulated signals, and transmits a resultant multiplexed signal, the M+L−1 being determined by a pseudonoise code sequence having a period of L chips and M chips which represents a number of pulse position information pieces corresponding to an information content to be transmitted, and a spread spectrum reception apparatus according to the second aspect which conducts delay correction processing on the multiplexed spread spectrum pulse position modulated signals received by using a pseudonoise code sequence identical to the pseudonoise code sequence used in the spread spectrum transmission apparatus, and conducts demodulation processing.

According to the third aspect, the transmission side conducts delay processing on a frame formed of M+L−1 chips. The M+L−1 chips is determined by a pseudonoise code sequence having a period of L chips and M chips which represents a number of pulse position information pieces corresponding to an information content to be transmitted. The transmission side then multiplexes N spread spectrum pulse position modulated signals, and transmits a resultant multiplexed signal. The reception side conducts delay correction processing on the multiplexed spread spectrum pulse position modulated signals received by using a pseudonoise code sequence identical to the pseudonoise code sequence used in the transmission side, and conducts demodulation processing.

Other objects and features of this invention will become understood from the following description with reference to the accompanying drawings.

DETAILED DESCRIPTION

Hereafter, preferred embodiments of a spread spectrum transmission apparatus, a spread spectrum reception apparatus, and a spread spectrum communication system according to the present invention will be described in detail by referring to the accompanying drawing.

First Embodiment

Figure 1:
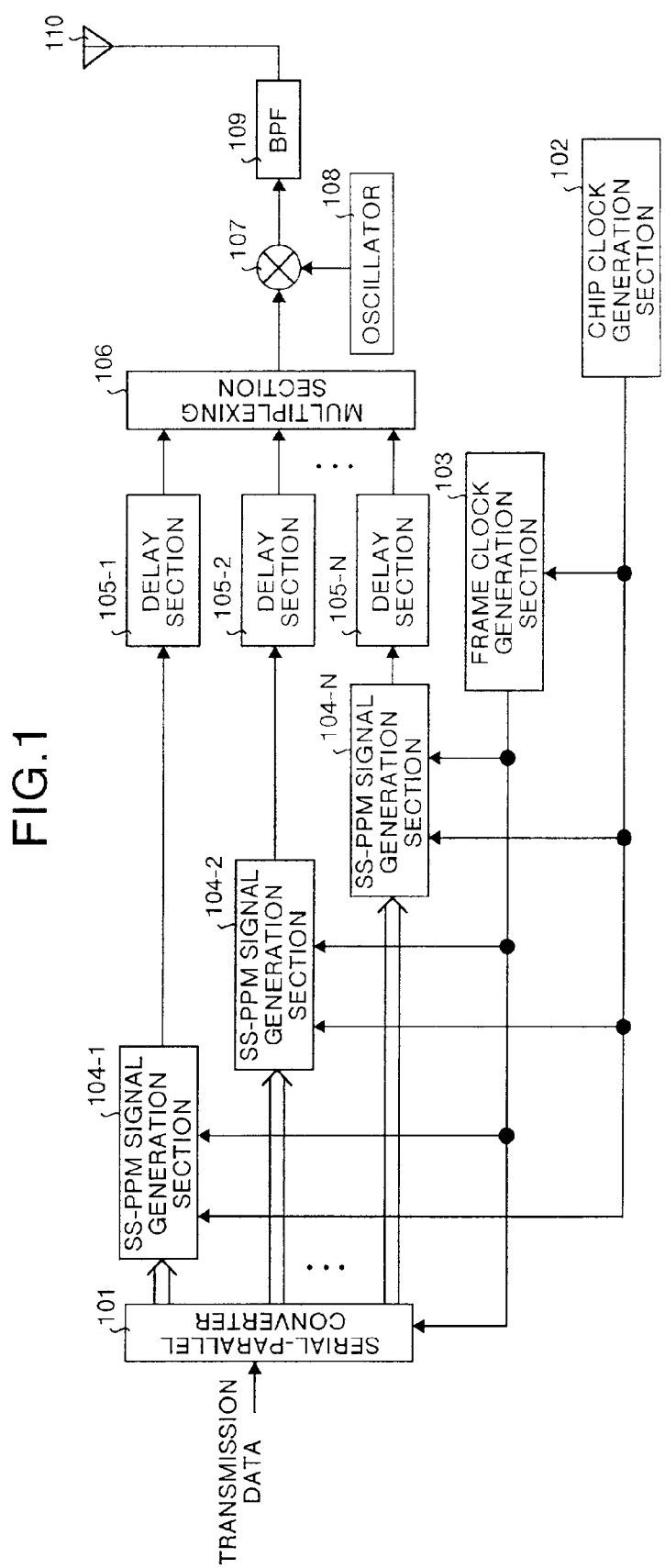
FIG. 1 is a block diagram showing a configuration of a spread spectrum transmission apparatus which is a first embodiment of the present invention.
Figure 2:
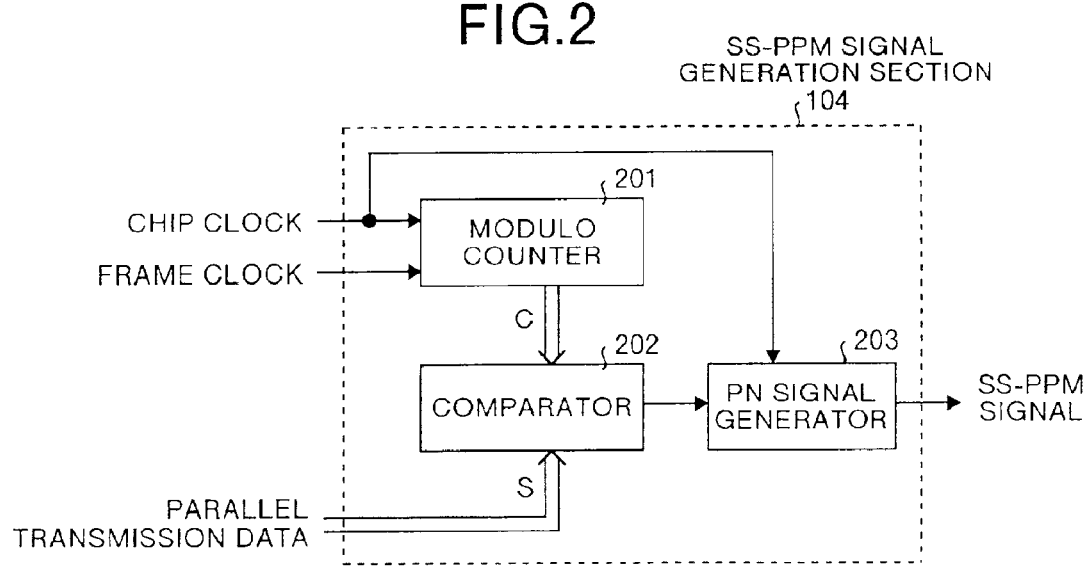
FIG. 2 is a block diagram showing a configuration of an SS-PPM signal generation section shown in FIG. 1.
Figure 3:
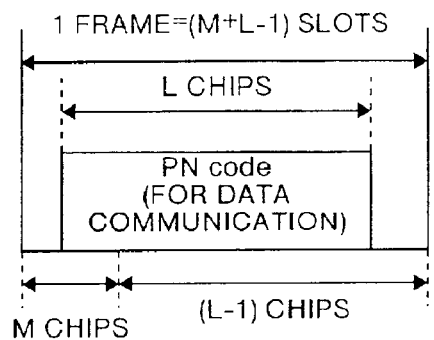
FIG. 3 is a diagram showing a frame structure used in a spread spectrum pulse position modulation communication scheme according to the present invention.
Figure 4:
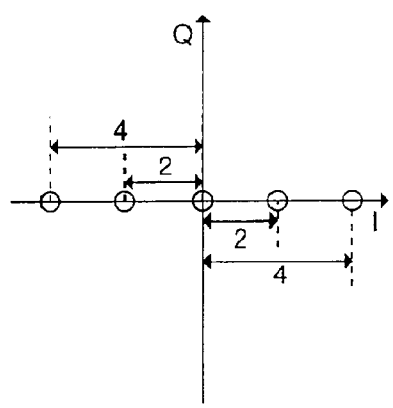
FIG. 4 is a diagram showing a signal point arrangement in the case of N=4 of a multiplexed SS-PPM signal which is transmitted by the spread spectrum transmission apparatus shown in FIG. 1.
Figure 5:
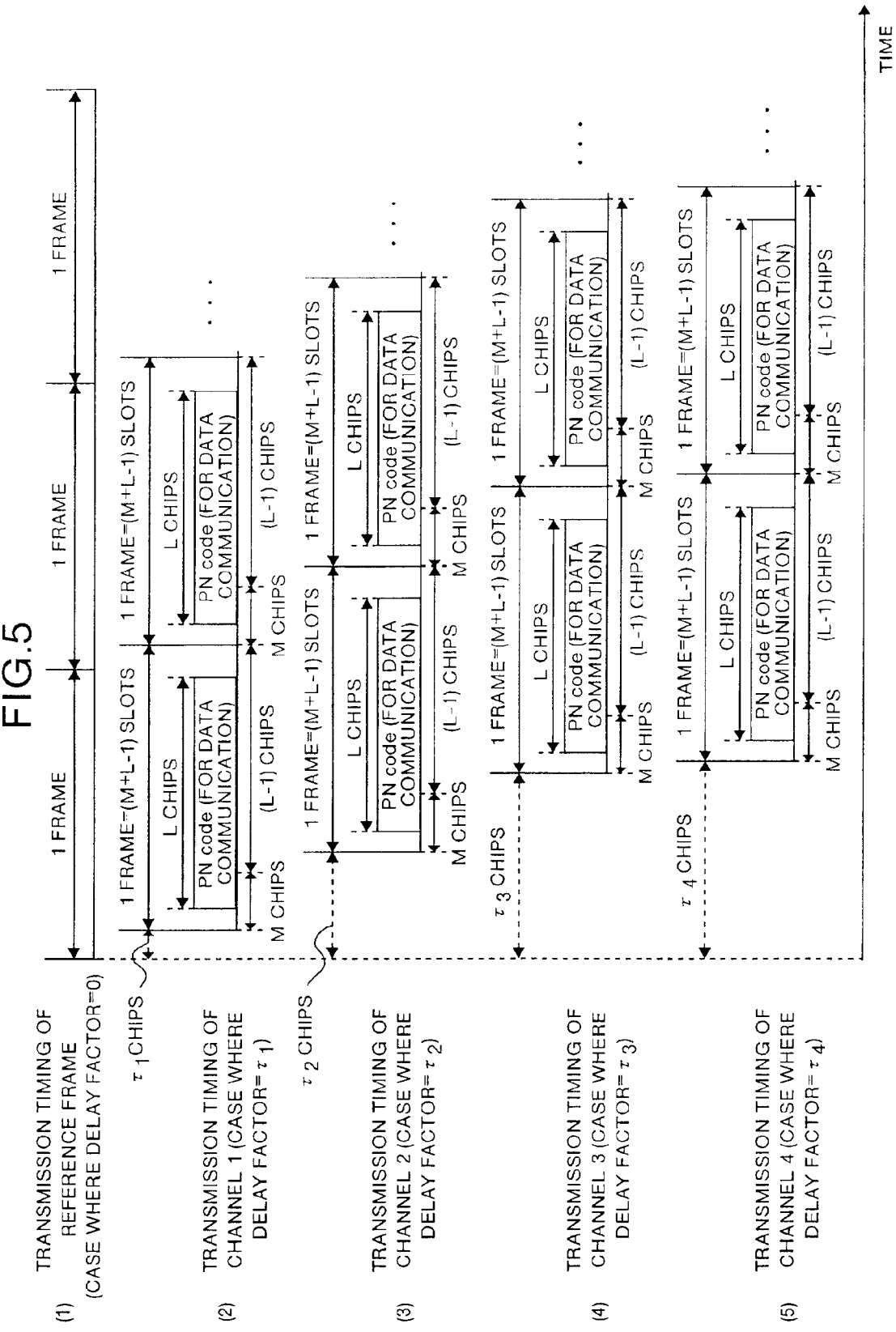
FIG. 5 is a diagram showing transmission operation in the case of N=4 of the spread spectrum transmission apparatus shown in FIG. 1.

FIG. 1 is a block diagram showing a configuration of a spread spectrum transmission apparatus which is a first embodiment of the present invention. FIG. 2 is a block diagram showing a configuration of an SS-PPM signal generation section shown in FIG. 1. FIG. 3 is a diagram showing a frame structure used in a spread spectrum pulse position modulation communication scheme according to the present invention. FIG. 4 is a diagram showing a signal point arrangement in the case of N=4 of a multiplexed SS-PPM signal which is transmitted by the spread spectrum transmission apparatus shown in FIG. 1. FIG. 5 is a diagram showing transmission operation in the case of N=4 of the spread spectrum transmission apparatus shown in FIG. 1.

As shown in FIG. 1, a spread spectrum transmission apparatus according to the first embodiment includes a series-parallel conversion section 101, a chip clock generation section 102, a frame clock generation section 103, N (where N is an integer of at least 2) spread spectrum pulse position modulated signal generation sections (hereafter referred to as SS-PPM signal generation section) 104-1 to 104-N, N delay sections 105-1 to 105-N, a multiplexing section 106, a modulator 107, an oscillator 108, a band pass filter (BPF) 109, and an antenna 110.

As shown in FIG. 2, each of N SS-PPM signal generation sections 104-1 to 104-N includes a modulo counter 201, a comparator 202, and a pseudonoise signal generator (hereafter referred to as PN signal generator) 203. In FIG. 2, representative one is shown as a SS-PPM signal generation section 104.

Operation of the spread spectrum transmission apparatus according to the first embodiment having the above-described configuration will now be explained. In the frame structure used in the spread spectrum pulse position modulation communication scheme shown in the first embodiment and embodiments explained hereafter, one frame is formed of M+L−1 slots as shown in FIG. 3. L denotes the length (the number of chips) of a pseudonoise code sequence (PN code) in use. M denotes the number of pulse position information pieces (the number of chips) of spread spectrum pulses (SS pulses) which corresponds to an information content to be inserted and transmitted in one frame. One slot length is equal to one chip of the pseudonoise code. As shown in FIG. 3, the number M of pulse position information pieces of SS pulses is disposed at the head of the frame.

In FIG. 1, the chip clock generation section 102 generates a clock having a clock rate which corresponds to the chip rate in the direct sequence scheme in one frame formed of M+L−1 chips, and outputs it to the frame clock generation section 103 and the N SS-PPM signal generation sections 104-1 to 104-N. Hereafter, this clock is referred to as chip clock, and the clock rate of the clock is denoted by Rc.

The frame clock generation section 103 conducts frequency division on the chip clock at a ratio of 1/(M+L−1), thereby generates a frame clock having a clock rate Rf (Rf=Rc/(M+L−1)), and outputs it to the serial-parallel conversion section 101 and the N SS-PPM signal generation sections 104-1 to 104-N.

The serial-parallel conversion section 101 converts one input serial transmission data sequence to (K×N) parallel transmission data sequence in accordance with the frame clock fed from the frame clock generation section 103. K is the number of bits which can be transmitted per frame, and K is an integer having a value represented as K≧2. N is the number of channels which can be used per user, and N is an integer having a value represented as N≧2. K-bit parallel transmission data of N channels conversion-output by the serial-parallel conversion section 101 are supplied to the N SS-PPM signal generation sections 104-1 to 104-N, respectively.

By using a rising edge of the frame clock fed from the frame clock generation section 103 as a reference, each of the N SS-PPM signal generation sections 104-1 to 104-N inserts a pseudonoise code sequence corresponding to one period obtained from some of M chips located at the head of a frame, once per frame period Tf (Tf=1/Rf) at timing based on K-bit parallel transmission data to be transmitted in each channel. Thereby, each of the N SS-PPM signal generation sections 104-1 to 104-N generates a spread spectrum pulse position modulated signal (hereafter referred to as SS-PPM signal), and outputs it to corresponding one of the delay sections 105-1 to 105-N.

By referring to FIG. 2, concrete operation of the N SS-PPM signal generation sections 104-1 to 104-N will now be explained. In FIG. 2, the modulo counter 201 is set to a value 0 at the time of a rising edge of the frame clock output from the frame clock generation section 103. The modulo counter 201 counts from the value 0 to a value of M+L−2 in synchronism with the chip clock output from the chip clock generation section 102, and outputs the count value C to the comparator 202.

The comparator 202 compares the count value C of the modulo counter 201 with a binary value S of the K-bit parallel transmission data output from the serial-parallel conversion section 101 to determine whether they coincide with each other. If they coincide with each other (C=S), then the comparator 202 outputs a logic "1" to the PN signal generator 203. S and C satisfy the relations 0≦S<M and 0≦C<M+L−1.

When a pulse has got on the output signal of the comparator 202, the PN signal generator 203 generates a pseudonoise code sequence (a SS-PPM signal) over L chips, and then outputs a "0." Thereby, the PN signal generator 203 outputs the SS-PPM signal to a corresponding delay section. The pseudonoise code sequence (SS-PPM signal) is assumed to have values of "1" and "−1."

Referring back to FIG. 1, the N delay sections 105-1 to 105-N respectively provide the SS-PPM signals of N channels respectively output from the N SS-PPM signal generation sections 104-1 to 104-N with predetermined delays, and output them to the multiplexing section 106. Denoting delay factors the delay sections 105-1 to 105-N have by $\tau_1$, $\tau_2$, $\tau_3$, ..., $\tau_N$ and the chip period by $T_c$ ($T_c$=1/Rc), the delayed SS-PPM signal output by respective delay sections are signals provided with time offsets $\tau_1 T_c$ to $\tau_N T_c$. Delay factors $\{\tau_1, \tau_2, \tau_3, \ldots, \tau_N\}$ are integers satisfying the relations $0 \leq \tau_1, \tau_2, \tau_3, \ldots, \tau_N < L$.

The multiplexing section 106 adds all delayed SS-PPM signals output from the N delay sections 105-1 to 105-N, thereby generates a multiplexed SS-PPM signal, and outputs the multiplexed SS-PPM signal thus generated to the modulator 107.

The modulator 107 multiplies the multiplexed SS-PPM signal output from the multiplexing section 106 by a carrier signal output from the oscillator 108. The multiplied signal is subject to filtering processing of removing undesired frequency components in the bandpass filter (BPF) 109, amplified suitably by a buffer amplifier or an output amplifier although not illustrated, and output from the antenna 110 as a radio wave.

An arrangement of multiplexed signal points is indicated on a phase plane formed by an I axis (in-phase axis) and a Q axis (quadrature axis). However, signal points of the multiplexed SS-PPM signal generated by the multiplexing section 106 have been subjected to delay processing. For example, as shown in FIG. 4, therefore, the signal points are disposed at predetermined intervals on the I axis (in-phase axis). In FIG. 4, it is shown that in the case where the number N of multiplexed channels is N=4 signal point positions are prescribed on the I axis (in-phase axis). In FIG. 4, the signal point position is located on the origin of the coordinates in the case where a delay is not involved. As for four delayed channels, denoting the amplitude of the SS-PPM signal corresponding to one channel by "1," two signal points are located in positions of amplitude "2" on the left and right sides of the origin of the coordinates, and two signal points are located in positions of the maximum amplitude "4."

Transmission frames of the multiplexed SS-PPM signal generated by the multiplexing section 106 are output with, for example, time relations as shown in FIG. 5. FIG. 5 shows time relations of the transmission frames in the case where the number N of multiplexed channels is N=4. In FIG. 5, (1) shows reference frame transmission timing in the case where the delay factor is 0. It is now assumed that channels 1, 2, 3 and 4 are input to the multiplexing section 106 with delay factors $\tau_1$, $\tau_2$, $\tau_3$ and $\tau_4$, respectively.

As shown in (2) of FIG. 5, transmission timing of the channel 1 is delayed from the reference frame transmission timing by $\tau_1$ chips. As shown in (3) of FIG. 5, transmission timing of the channel 2 is delayed from the reference frame transmission timing by $\tau_2$ chips. As shown in (3) of FIG. 5, transmission timing of the channel 3 is delayed from the reference frame transmission timing by $\tau_3$ chips. As shown in (5) of FIG. 5, transmission timing of the channel 4 is delayed from the reference frame transmission timing by $\tau_4$ chips.

While the spread spectrum transmission apparatus according to the first embodiment thus operates by using one pseudonoise code sequence per user, a spread spectrum reception apparatus is formed according to a second embodiment described hereafter. Thereby, in the spread spectrum communication system adopting the spread spectrum pulse position modulation communication scheme according to the present invention, a transmission speed tr' represented by the following equation (2) can be implemented.

$$tr' = N \times \frac{\log_2 M}{(M+L-1)} R_c \qquad (2)$$

Whereas the denominator is M+2L in the equation (1), the denominator is M+L−1 in the equation (2). The denominator in the equation (2) is thus less than the denominator in the equation (1). In addition, multiplication by N (channels) is conducted in the equation (2). It will be appreciated that the transmission speed tr' represented by the equation (2) is faster than the transmission speed tr of the conventional spread spectrum pulse position modulation communication scheme represented by the equation (1).

Second Embodiment

Figure 6:
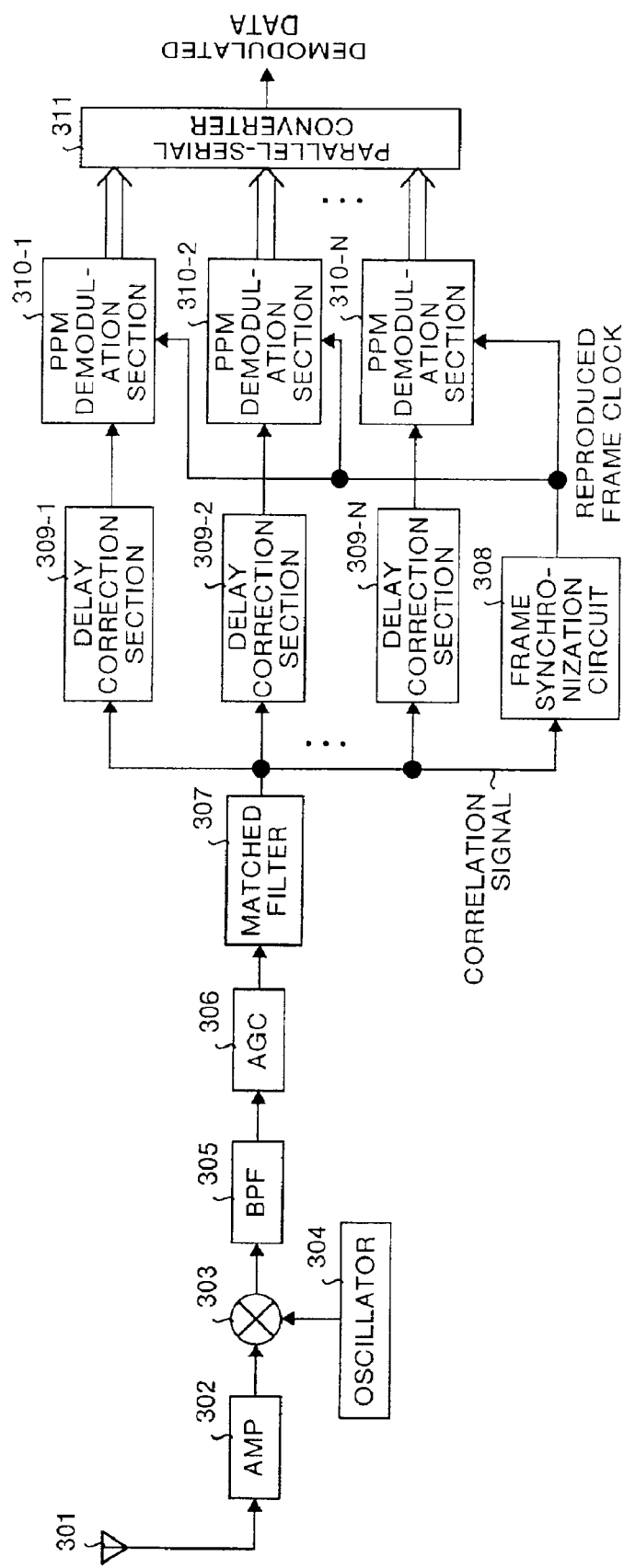
FIG. 6 is a block diagram showing a configuration of a spread spectrum reception apparatus which is a second embodiment of the present invention.
Figure 7:
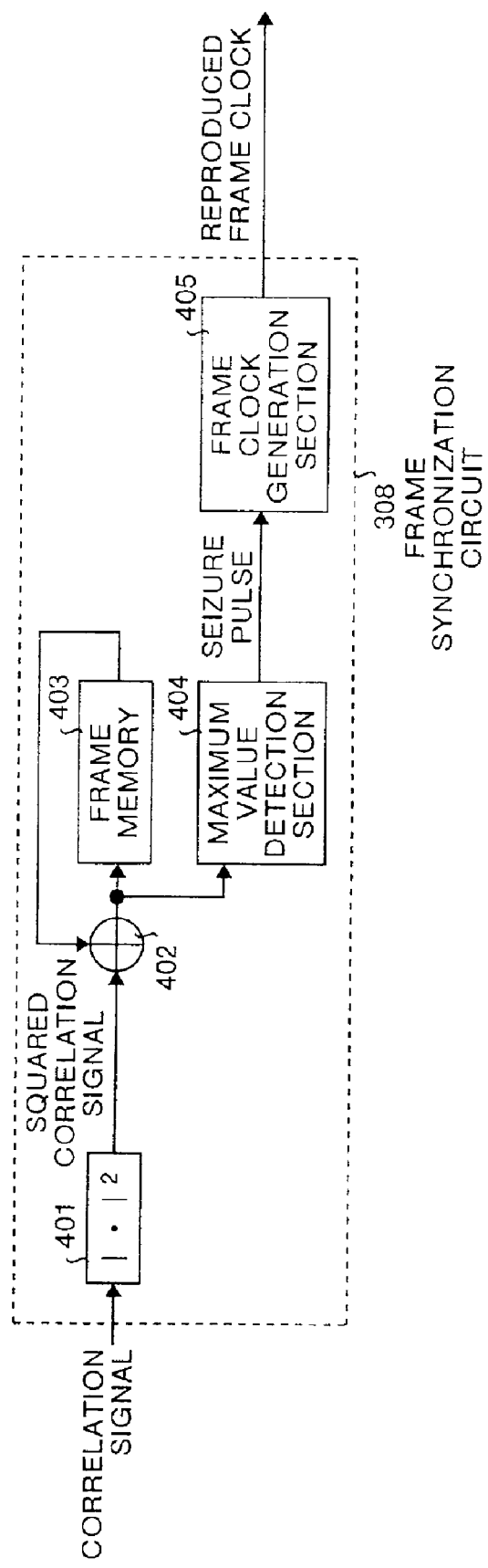
FIG. 7 is a block diagram showing a configuration of a frame synchronization circuit shown in FIG. 6.
Figure 8:
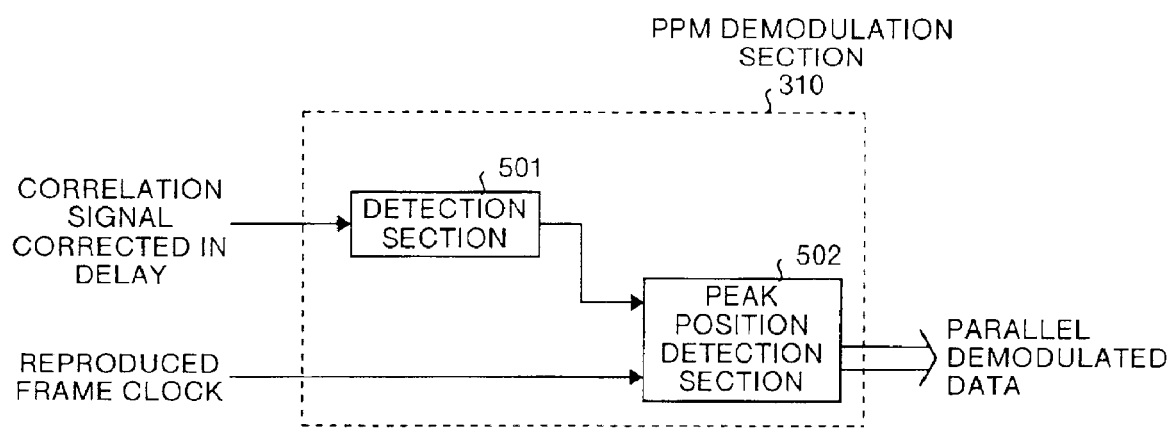
FIG. 8 is a block diagram showing a configuration of a PPM demodulation section shown in FIG. 6.

FIG. 6 is a block diagram showing a configuration of a spread spectrum reception apparatus which is a second embodiment of the present invention. FIG. 7 is a block diagram showing a configuration of a frame synchronization circuit shown in FIG. 6. FIG. 8 is a block diagram showing a configuration of a PPM demodulation section shown in FIG. 6.

As shown in FIG. 6, a spread spectrum reception apparatus according to the second embodiment includes an antenna 301, an amplifier 302, a modulator 303, an oscillator 304, a band pass filter (BPF) 305, an automatic gain control circuit (AGC) 306, a matched filter 307, a frame synchronization circuit 308, N delay correction sections 309-1 to 309-N, N pulse position demodulation sections (hereafter referred to as PPM demodulation sections) 310-1 to 310-N, and a parallel-serial conversion section 311.

More specifically, as shown in, for example, FIG. 7, the frame synchronization circuit 308 includes a square calculation section 401, an addition section 402, a frame memory 403, a maximum value detection section 404, and a frame clock generation section 405. Each of the N PPM demodulation sections) 310-1 to 310-N includes a detection section 501 and a peak position detection section 502. In FIG. 8, they are represented by a PPM demodulation section 310.

Operation of the spread spectrum reception apparatus according to the second embodiment having the above-described configuration will now be explained. In FIG. 6, a received signal received by the antenna 301 is similar to the transmission signal of the spread spectrum transmission apparatus shown in the first embodiment except the transmission distortion and transmission delay. The received signal is amplified by the amplifier 302, converted to a signal of an intermediate frequency in the modulator 303 by using a local signal fed from the oscillator 304. The signal of the intermediate frequency is subjected to signal band width limiting processing in the band pass filter (BPF) 305, and made a signal having a fixed level in the automatic gain control circuit (AGC) 306.

The signal output from the automatic gain control circuit (AGC) 306 is input to the matched filter 307. By using the same pseudonoise code sequence as the pseudonoise code sequence used in the spread spectrum transmission apparatus shown in the first embodiment, the matched filter 307 conducts correlation computation of the pseudonoise code sequence and the received signal. If there is an input which coincides with a pattern of the pseudonoise code sequence, then the matched filter 307 generates a correlation signal having pulse signals corresponding to one chip section, and outputs the generated correlation signal to the frame synchronization circuit 308 and the N delay correction sections 309-1 to 309-N.

The N delay correction sections 309-1 to 309-N provide the correlation signal output from the matched filter 307 with time delays which correct time offsets provided by the delay sections 105-1 to 105-N of the spread spectrum transmission apparatus shown in FIG. 1, thereby align the start timing of frames for a total of N channels, and output the aligned frames to the N PPM demodulation sections 310-1 to 310-N, respectively.

The frame synchronization circuit 308 conducts frame synchronization on the basis of the correlation signal output from the matched filter 307, and generates a reproduced frame clock synchronized to the frame period, and outputs the reproduced frame clock thus generated to N PPM demodulation sections 310-1 to 310-N in parallel.

More specifically, the frame synchronization circuit 308 generates the reproduced frame clock from the correlation signal in the following manner. In FIG. 7, the correlation signal output from the matched filter 307 is subject to square computation processing in the square calculation section 401, and supplied to one of inputs of the addition section 402. An output of the addition section 402 is supplied to the frame memory 403 and the maximum value detection section 404. An output of the frame memory 403 is supplied to the other input of the addition section 402.

In other words, the addition section 402 and the frame memory 403 conduct accumulative addition (cyclic addition) on the square correlation signal in one period. A result of the cyclic addition conducted on the square correlation signal corresponding to one frame period is stored in the frame memory 403. The maximum value detection section 404 detects a maximum value from the cyclic addition result of one frame period which has been subjected to addition in the addition section 402 and which is about to be stored in the frame memory 403. The maximum value is detected every frame period. The maximum value detection section 404 outputs a seizure pulse which maintains a value of 1 only for one chip period time at timing of occurrence of the maximum value. In the case where the result of the cyclic addition has a value other than the maximum value, the maximum value detection section 404 outputs a value of 0. The frame clock generation section 405 generates and outputs a reproduced frame clock synchronized to a period at which the seizure pulse output from the maximum value detection section 404 becomes the value of 1.

Referring back to FIG. 6, the N PPM demodulation sections 310-1 to 310-N conduct pulse position demodulation by using the reproduced frame clock output from the frame synchronization circuit 308 and the correlation signals corrected in delay and output from the delay correction sections 309-1 to 309-N, generate parallel demodulated data sequences each having K bits and output the parallel demodulated data sequences to the parallel-serial conversion section 311.

More specifically, N PPM demodulation sections 310-1 to 310-N generate parallel demodulated data from the correlation signals corrected in delay and the reproduced frame clock in the following manner. In FIG. 8, the correlation signal output from the delay correction section and corrected in delay is envelop-detected by the detection section and input to the peak position detection section 502. The peak position detection section 502 derives a difference between time of occurrence of a rising edge of the reproduced frame clock output from the frame synchronization circuit 308 and time when the output signal of the detection section 501 has a peak value. On the basis of the difference time, the peak position detection section 502 conducts pulse position demodulation, and outputs the K-bit parallel demodulated data sequence.

Referring back to FIG. 6, the parallel-serial conversion section 311 conducts parallel-serial conversion on a total of K×N parallel demodulated data sequences thus output from the N PPM demodulation sections 310-1 to 310-N, and outputs one demodulated data sequence.

With respect to an arbitrary frame of each channel shown in FIG. 5 in the second embodiment, the matched filter 307 generates a pulsative correlation signal for one arbitrary chip subjected to PPM modulation and included in M chips located at the head section of the frame.

The delay sections 105-1 to 105-N of the spread spectrum transmission apparatus shown in FIG. 1 provide time offsets in which the delay factors $\{\tau_1, \tau_2, \tau_3, \ldots, \tau_N\}$ always satisfy $|\tau_x - \tau_y| \geq M$ for arbitrary $x \in [1, 2, \ldots, N]$ and $y \in [1, 2, \ldots, N]$ which satisfy $x \neq y$.

In the spread spectrum reception apparatus according to the second embodiment, therefore, duplication of a section in which the matched filter 307 generates a pulsative correlation signal for respective channels is prevented. Accordingly, it is possible to implement a favorable demodulation characteristic for transmission signals of respective channels.

As shown in FIG. 7, the frame synchronization circuit 308 is formed so as to conduct the frame synchronization by detecting the correlation peak position. This aims at achieving the frame synchronization by detecting a peak value of the correlation signal generated at determined timing every frame period in one or more channels, in SS-PPM signals of N channels generated by the spread spectrum transmission apparatus shown in FIG. 1. As a result, it is possible to conduct the frame synchronization with high precision.

By combining the spread spectrum reception apparatus according to the second embodiment with the spread spectrum reception apparatus shown in FIG. 1, therefore, it is possible to provide a spread spectrum communication system capable of conducting data transmission faster than the transmission speed of the conventional spread spectrum pulse position modulation communication scheme represented by the equation (1), by using one pseudonoise code sequence per user.

Third Embodiment

Figure 9:
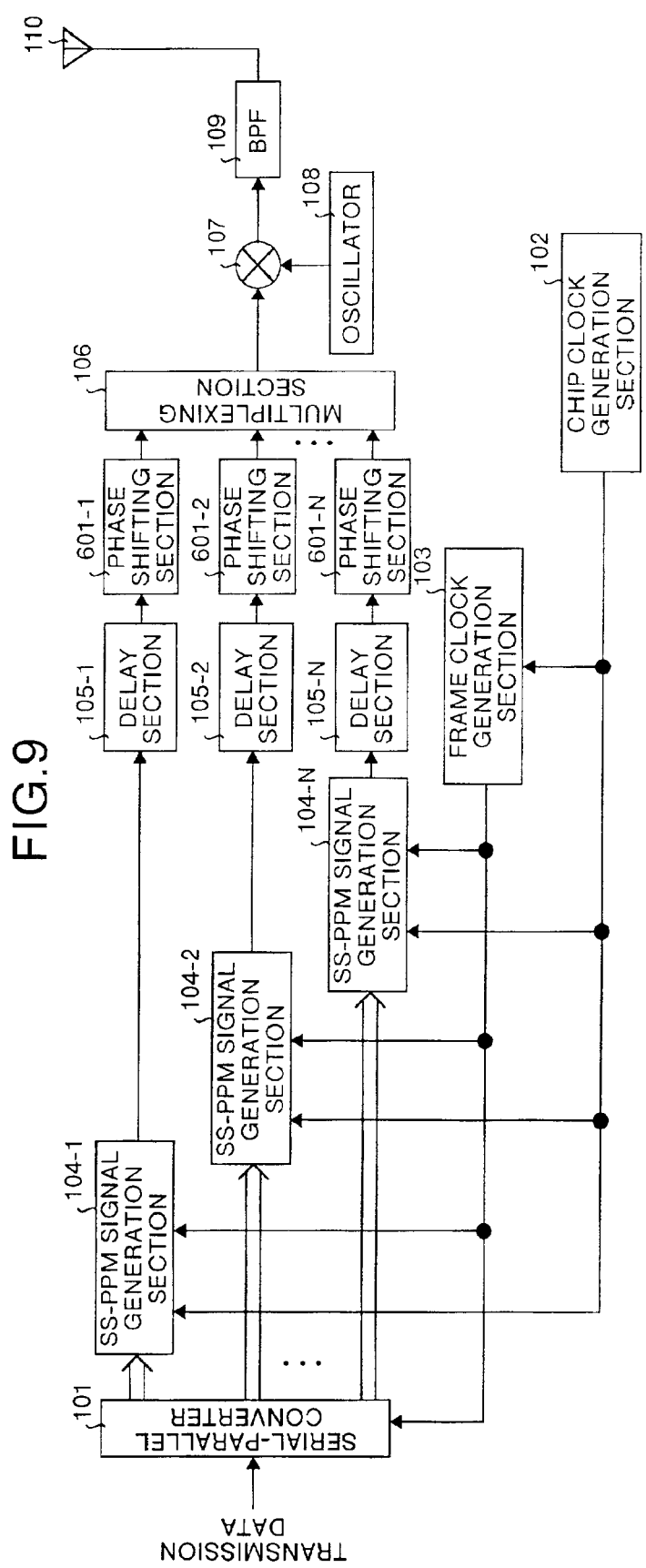
FIG. 9 is a block diagram showing a configuration of a spread spectrum transmission apparatus which is a third embodiment of the present invention.
Figure 10:
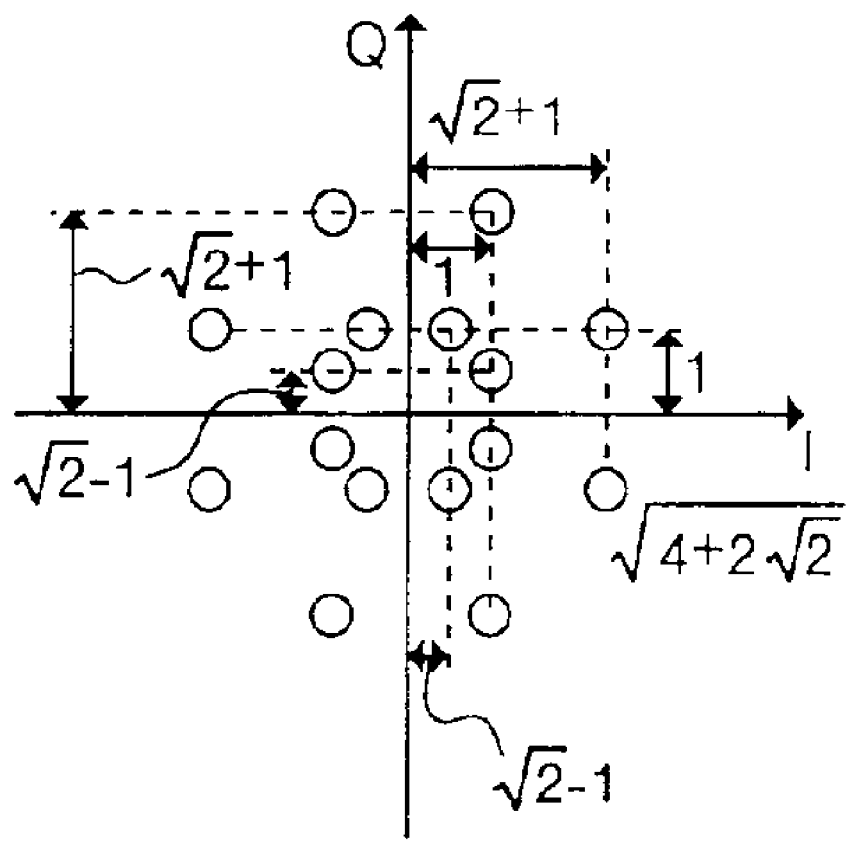
FIG. 10 is a diagram showing a signal point arrangement in the case of N=4 of a multiplexed SS-PPM signal which is transmitted by the spread spectrum transmission apparatus shown in FIG. 9, FIGS. 11A and 11B are block diagrams showing alternative configurations of a spread spectrum reception apparatus which is a fourth embodiment of the present invention.

FIG. 9 is a block diagram showing a configuration of a spread spectrum transmission apparatus which is a third embodiment of the present invention. FIG. 10 is a diagram showing a signal point arrangement of the multiplexed SS-PPM signal transmitted by the spread spectrum transmission apparatus shown in FIG. 9 in the case where N=4.

In FIG. 9, the same components as those of the spread spectrum transmission apparatus shown in FIG. 1 are denoted by like characters. In the spread spectrum transmission apparatus according to the third embodiment, N phase shift sections 601-1 to 601-N are provided between N delay sections 105-1 to 105-N and the multiplexing section 106 as shown in FIG. 9. Other components are the same as those shown in FIG. 1. The configuration of FIG. 9 will now be explained centering on a portion concerning the third embodiment.

In FIG. 9, the N phase shift sections 601-1 to 601-N shift phases of delayed SS-PPM signals of N channels output by the N delay sections 105-1 to 105-N by predetermined phase shift quantities $\{\alpha_1, \alpha_2, \alpha_N, \ldots, \alpha_N\}$, respectively, and output resultant signals to the multiplexing section 106.

Denoting in-phase and quadrature components of a certain delayed SS-PPM signal respectively by Is and Qs, and a phase shift quantity by "a" radian, the term "shift the phase" means conducting the processing represented by the following two equations.

$$I_d = \sqrt{I_s^2 + Q_s^2} \times cos(\alpha + \theta) \quad (3)$$

$$Q_d = \sqrt{I_s^2 + Q_s^2} \times sin(\alpha + \theta) \quad (4)$$

In the equations (3) and (4), $I_d$ and $Q_d$ denote in-phase and quadrature components of the delayed SS-PPM signal after the phase shift, respectively, and θ [radian] is calculated by the following equation (5).

$$\theta = \tan^{-1} \frac{Q_s}{I_s} \quad (5)$$

The multiplexing section 106 adds up all signals output from the N phase shift sections 601-1 to 601-N, thereby generates a multiplexed SS-PPM signal, and outputs the generated SS-PPM signal to the modulator 107.

In the third embodiment, therefore, transmission timing of respective channels of the multiplexed SS-PPM signal generated by the multiplexing section 106 becomes similar to that of the first embodiment. In the case where the number of multiplexed channels N=4, the relations shown in FIG. 5 hold true. As for the arrangement of signal points, however, for example, signal points disperse on the phase plane formed by the I axis (in-phase axis) and Q axis (quadrature axis) with fixed relations as shown in FIG. 10, because there are the N phase shift sections 601-1 to 601-N.

FIG. 10 shows the arrangement of the case where the number of multiplexed channels N is N=4 and the phase shift quantities $(\alpha_1, \alpha_2, \alpha_N, \alpha_4)$ are set to $\alpha_1 = 0$, $\alpha_2 = \pi/4$, $\alpha_N = \pi/2$, and $\alpha_4 = 3\pi/4$. As shown in FIG. 10, eight signal points are disposed at equal intervals on each of two concentric circles. In the first quadrant, positions (I, Q) of two signal points located on the smaller concentric circle are $(v(2)-1, 1)$ and $(1, v(2)-1)$. Positions (I, Q) of two signal points located on the larger concentric circle are $(1, v(2)+1), (v(2)+1, 1)$, and the distance (maximum amplitude) from the origin is $v(4+2 v(2))$ ($\approx 2.61$). If the phase shift quantities $(\alpha_1, \alpha_2, \alpha_N, \alpha_4)$ are set to $\alpha_1 = \alpha_2 = \alpha_N = \alpha_4 = 0$, then the arrangement of signal points becomes similar to that shown in FIG. 4.

In the case of FIG. 4, the maximum amplitude becomes "4." In the third embodiment, the maximum amplitude becomes approximately "2.61." Therefore, it will be appreciated that the maximum amplitude can be suppressed to a smaller value as compared with the first embodiment by conducting phase shift processing.

In the third embodiment, the value of the maximum amplitude of the multiplexed SS-PPM signal can thus be suppressed to a small value. Therefore, the influence of the signal distortion of the nonlinear amplifier disposed in the input stage of the reception apparatus can be reduced. Degradation of the bit error rate characteristic caused by the signal distortion can be reduced as compared with the first embodiment.

In other words, in the spread spectrum communication system including the spread spectrum transmission apparatus according to the third embodiment which operates by using one pseudonoise code sequence per user and the spread spectrum reception apparatus formed as shown in a fourth embodiment explained hereafter, a communication system capable of conducting data communication with a fast transmission speed represented by the equation (2) can be implemented in the same way as the spread spectrum communication system including the spread spectrum transmission apparatus according to the first embodiment and the spread spectrum reception apparatus according to the second embodiment. In addition, a more favorable bit error rate characteristic can be obtained also in the case where the multiplexed SS-PPM signal is subjected to nonlinear amplification.

Fourth Embodiment

Figure 11A:
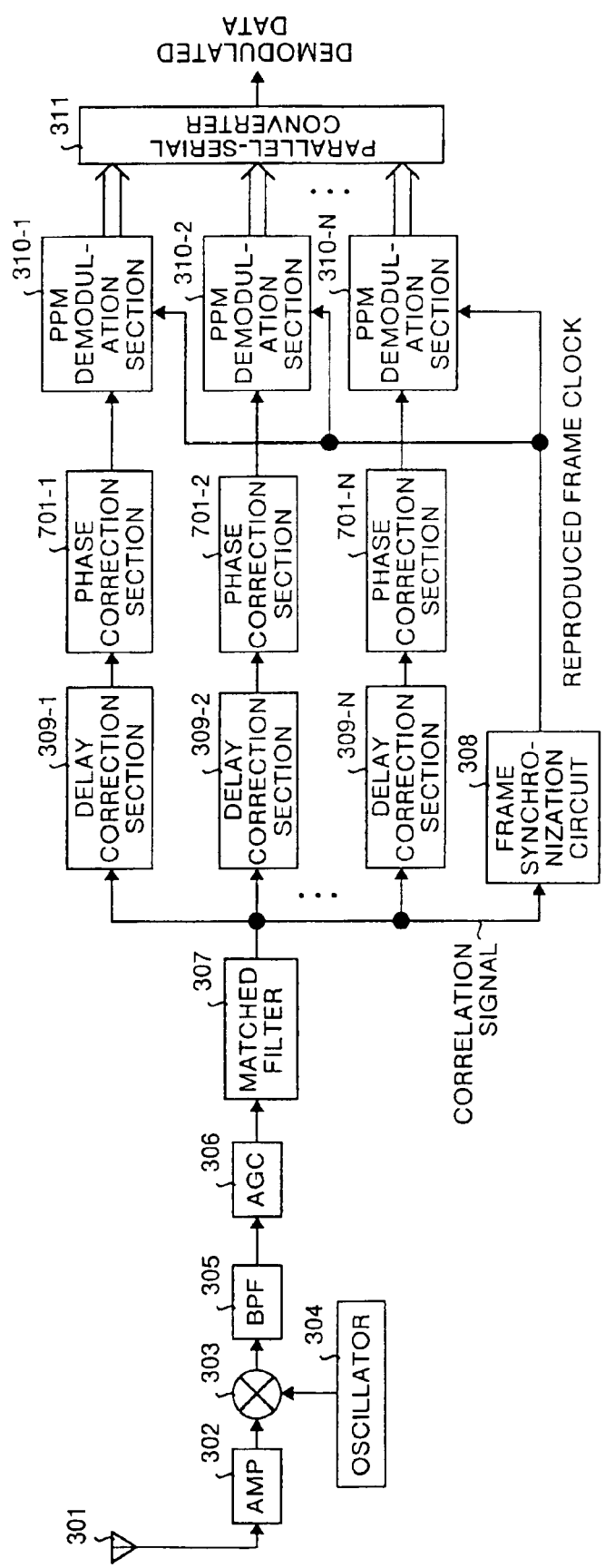
Figure 11B:
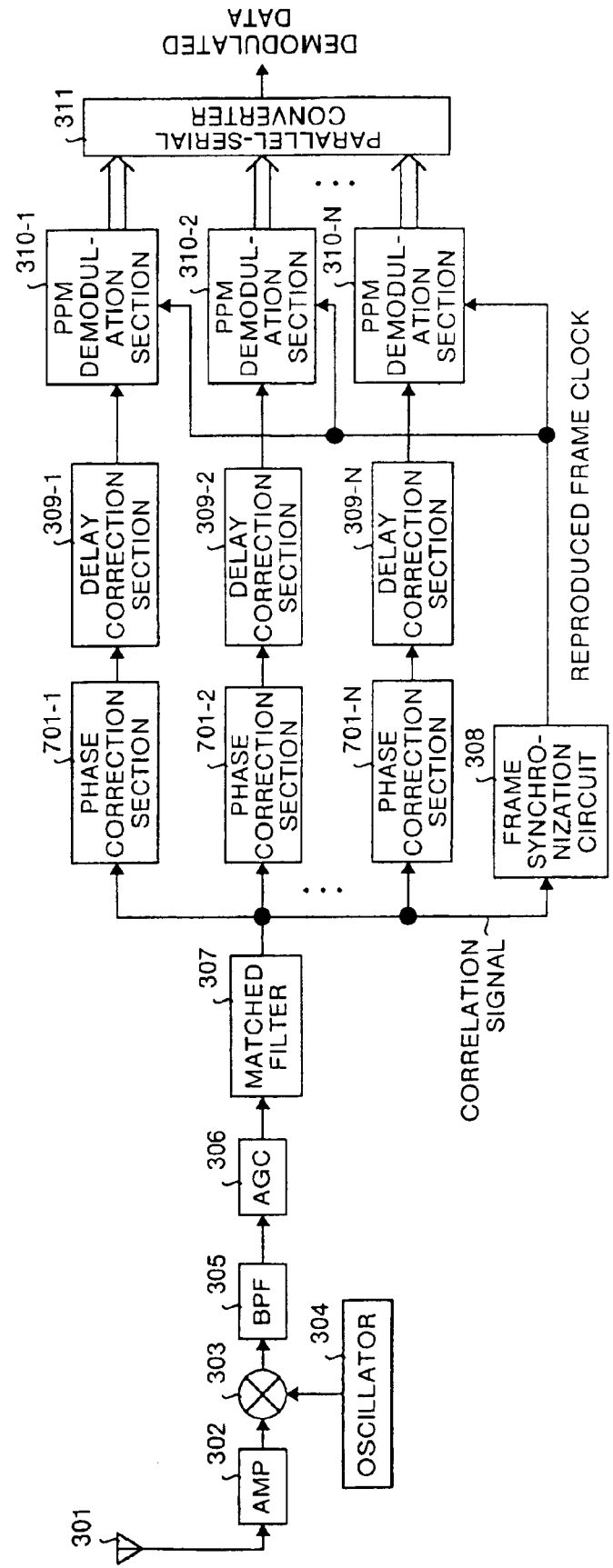
Figure 12:
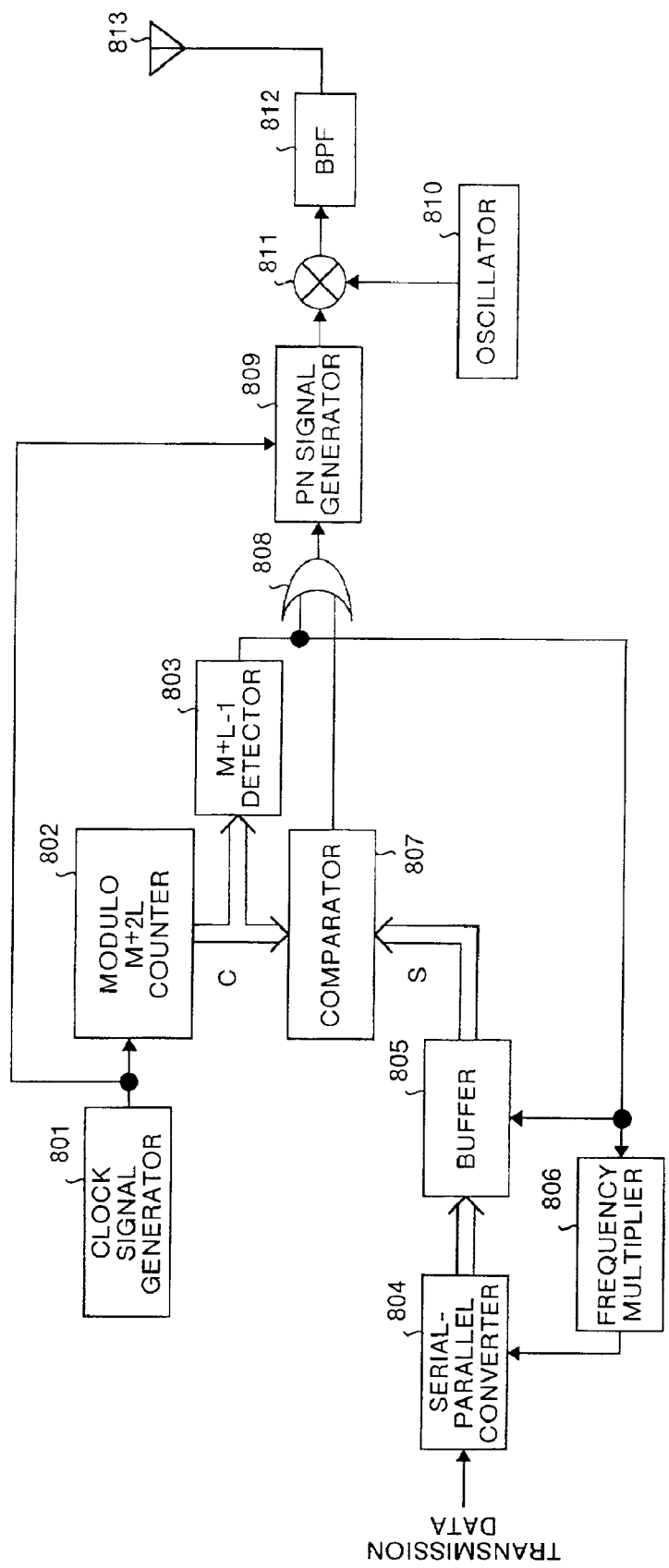
FIG. 12 is a block diagram showing a configuration of a spread spectrum transmission apparatus used in the conventional spread spectrum pulse position modulation communication scheme.
Figure 13:
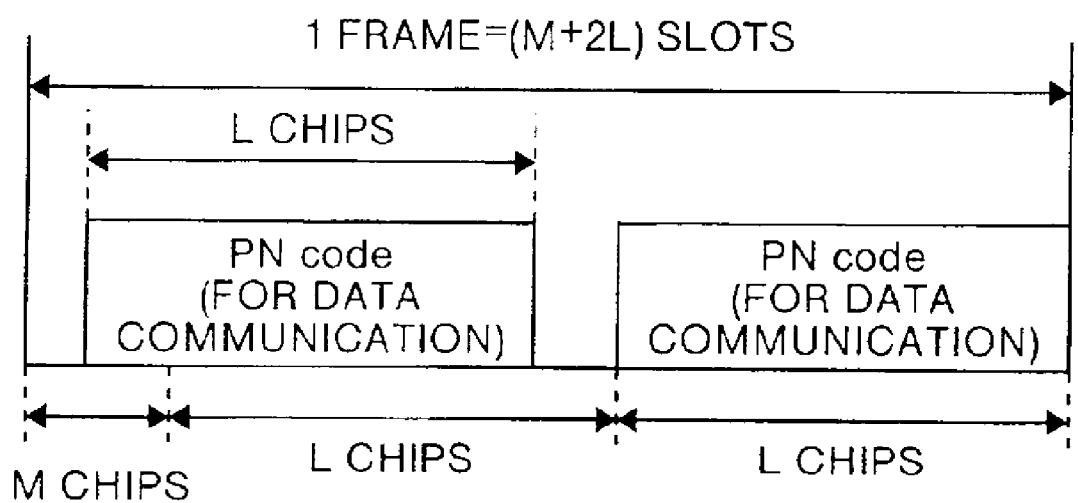
FIG. 13 is a diagram showing a frame structure used in the conventional spread spectrum pulse position modulation communication scheme.
Figure 14:
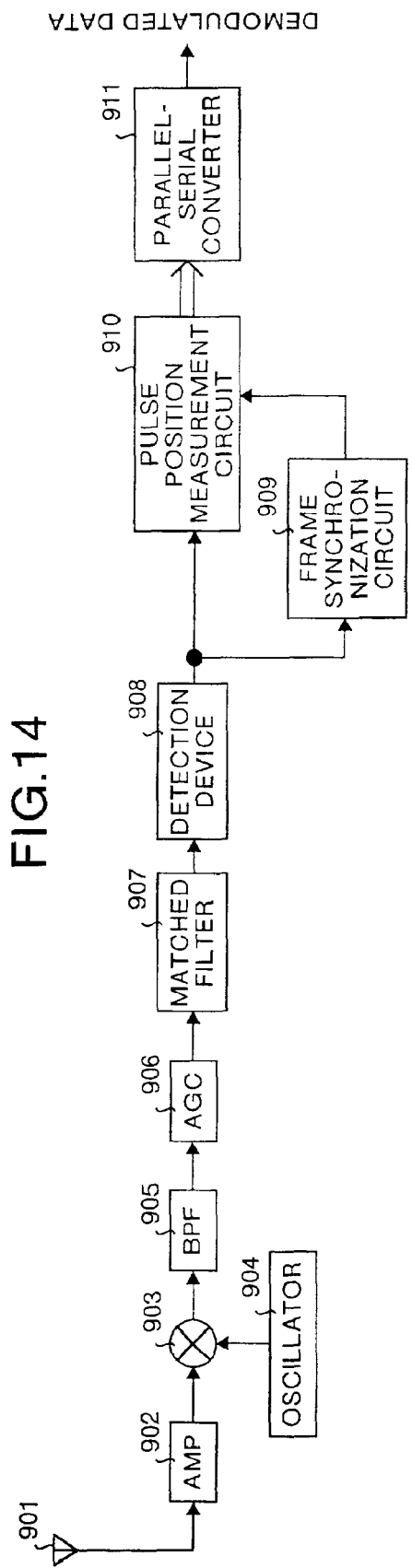
FIG. 14 is a block diagram showing a configuration of a spread spectrum reception apparatus used in the conventional spread spectrum pulse position modulation communication scheme.

FIGS. 11A and 11B are block diagrams each showing a configuration of a spread spectrum reception apparatus which is a fourth embodiment of the present invention. In FIGS. 11A and 11B, the same components as those of the spread spectrum reception apparatus shown in FIG. 6 are denoted by like characters.

In the spread spectrum reception apparatus according to the fourth embodiment, N phase correction sections 701-1 to 701-N are provided. The N phase correction sections 701-1 to 701-N may be provided between N delay correction sections 309-1 to 309-N and N PPM demodulation sections 310-1 to 310-N as shown in FIG. 11A. Alternatively, the N phase correction sections 701-1 to 701-N may be provided on the input side of he N delay correction sections 309-1 to 309-N as shown in FIG. 11B. Other components are the same as those shown in FIG. 6. The configuration of FIG. 11 will now be explained centering on a portion concerning the fourth embodiment.

The N phase correction sections 701-1 to 701-N provide correlation signals of N frames aligned in start timing by N delay correction sections 309-1 to 309-N respectively with phase shift quantities $\{-\alpha_1, -\alpha_2, -\alpha_N, \ldots, -\alpha_N\}$ [radian] which correct phase shift quantities added by N phase shift sections 601-1 to 601-N of the spread spectrum transmission apparatus according to the third embodiment shown in FIG. 9. Thus the N phase correction sections 701-1 to 701-N align carrier phases of correlation signals for a total of N channels.

The N PPM demodulation sections 310-1 to 310-N conduct pulse position demodulation by using the reproduced frame clock output from the frame synchronization circuit 308 and the correlation signals corrected in delay, corrected in phase, and output from the N phase correction sections 701-1 to 701-N, generate parallel demodulated data sequences each having K bits and output the parallel demodulated data sequences to the parallel-serial conversion section 311.

As a result, the parallel-serial conversion section 311 can conduct parallel-serial conversion on a total of K×N parallel demodulated data sequences output from the PPM demodulation sections 310-1 to 310-N, and output one demodulated data sequence, in the same way as the spread spectrum reception apparatus according to the second embodiment.

In the fourth embodiment as well, the frame synchronization circuit 308 conducts frame synchronization by detecting the correlation peak position as shown in FIG. 7 in the same way as the second embodiment. In one or more channels included in SS-PPM signals of the N channels generated by the spread spectrum transmission apparatus shown in FIG. 9, the peak value of the correlation signal generated at fixed timing of each frame period can be used for frame synchronization. Thus the frame synchronization can be conducted with high precision.

In the fourth embodiment as well, the delay sections 105-1 to 105-N of the spread spectrum transmission apparatus shown in FIG. 9 provide time offsets in which the delay factors $\{\tau_1, \tau_2, \tau_3, \ldots, \tau_N\}$ always satisfy $|\tau_x - \tau_y| \geq M$ for arbitrary $x \in [1, 2, \ldots, N]$, $y \in [1, 2, \ldots, N]$ which satisfies $x \neq y$, in the same way as the second embodiment. As a result, duplication of a section in which the matched filter 307 generates a pulsative correlation signal for respective channels is prevented. In other words, it is possible to implement a favorable demodulation characteristic for transmission signals of respective channels in the spread spectrum reception apparatus according to the fourth embodiment.

By combining the spread spectrum reception apparatus according to the fourth embodiment with the spread spectrum transmission apparatus shown in FIG. 9, therefore, it is possible to provide a spread spectrum communication system capable of conducting data transmission faster than the transmission speed of the conventional spread spectrum pulse position modulation communication scheme represented by the equation (1), having a favorable bit error rate characteristic, and implementing a favorable demodulation characteristic even in the case where the received signal is subjected to nonlinear amplification, by using one pseudonoise code sequence per user.

FIG. 11A, the phase correction processing is conducted after the delay correction processing has been conducted on the correlation signals. The order of the signal processing may be reversed. In other words, as shown in FIG. 11B, the delay correction processing may be conducted on the correlation signal after the phase correction processing.

The phase correction quantities in the phase correction sections 701-1 to 701-N are set to $\{-\alpha_1, -\alpha_2, -\alpha_N, \ldots, -\alpha_N\}$, respectively. However, the phase correction quantities in the phase correction sections 701-1 to 701-N are not restricted thereto. What is essential is that phase correction quantities align carrier phases of respective correlation signals of the N channels.

As heretofore explained, according to one aspect of this invention, multiplexing can be conducted by conducting delay processing on spread spectrum pulse position modulated signals of N channels generated by using one pseudonoise code sequence.

According to another aspect of this invention, K-bit parallel demodulated data sequences of N channels can be obtained by conducting processing of correcting delays given on the transmission side and pulse position demodulation on the correlation signal generated by using a pseudonoise code sequence identical to that of the transmission side.

According to still another aspect of this invention, there is obtained a spread spectrum communication system capable of transmitting and receiving spread spectrum pulse position modulated signals of N channels by using one pseudonoise code sequence. In this system, the transmission speed can be improved without increasing the circuit scales of the transmission apparatus and the reception apparatus.

According to still another aspect of this invention, on the transmission side, delay quantities supplied to the spread spectrum pulse position modulated signals of N channels are limited into a range which always satisfies a predetermined condition. On the reception side, therefore, it is possible to generate a pulsative correlation signal for one arbitrary chip subjected to pulse position modulation and included in M chips locate data frame head section. A favorable demodulation characteristic is thus obtained.

According to still another aspect of this invention, at least one channel of the spread spectrum pulse position modulated signals of received N channels can be used for frame synchronization. As a result, more reliable frame synchronization can be accomplished.

According to still another aspect of this invention, signals of N channels subjected to delay processing are arranged dispersively at predetermined intervals on a phase plane defined by an in-phase axis and a quadrature axis, as a result of the phase shift processing. Accordingly, the maximum amplitude can be reduced.

According to still another aspect of this invention, the delay processing and the phase shift processing conducted on the signals of N channels on the transmission side can be corrected. Since the maximum amplitude of the transmission signal is suppressed to a small value, the influence of signal distortion caused by nonlinear amplification is reduced at the time of reception, and a favorable bit error rate characteristic can be obtained.

According to still another aspect of this invention, there is obtained a spread spectrum communication system capable of transmitting and receiving spread spectrum pulse position modulated signals of N channels by using one pseudonoise code sequence. In this system, the transmission speed can be improved without increasing the circuit scales of the transmission apparatus and the reception apparatus, and a favorable bit error rate characteristic can be obtained.

According to still another aspect of this invention, on the transmission side, delay quantities supplied to the spread spectrum pulse position modulated signals of N channels are limited into a range which always satisfies a predetermined condition. On the reception side, therefore, it is possible to generate a pulsative correlation signal for one arbitrary chip subjected to pulse position modulation and included in M chips locate data frame head section. A favorable demodulation characteristic is thus obtained.

According to still another aspect of this invention, at least one channel of the spread spectrum pulse position modulated signals of received N channels can be used for frame synchronization. As a result, more reliable frame synchronization can be accomplished.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A spread spectrum transmission apparatus comprising:
   a chip clock generation unit which outputs a chip clock having a clock rate corresponding to a chip rate in one frame formed of M+L−1 chips, the M+L−1 being determined by a pseudonoise code sequence having a period of L chips and M chips which represents a number of pulse position information pieces corresponding to an information content to be transmitted,
   a frame clock generation unit which conducts frequency division on the chip clock output by the chip clock generation unit by a factor of M+L−1, and outputs a frame clock synchronized to frame occurrence timing;
   N (where N is an integer of 2 or greater) spread spectrum pulse position modulated signal generation units each of which inserts the pseudonoise code sequence corresponding to one period from some of the M chips located at a head of a frame based on K-bit (where K is an integer of 2 or greater) transmission data by taking a rising edge of the frame clock output by the frame clock generation unit as a reference, and generates a spread spectrum pulse position modulated signal;
   N delay units which delay outputs respectively of the N spread spectrum pulse position modulated signal generation units by determined delay quantities $\{\tau_1 T_c, \tau_2 T_c, \tau_3 T_c, \ldots, \tau_N T_c\}$ (where delay factors $\{\tau_1, \tau_2, \tau_3, \ldots, \tau_N\}$ are integers which satisfy $0 \leq \tau_1, \tau_2, \tau_3, \ldots, \tau_N < L$, and $T_c$ is a chip period); and
   a multiplexing unit which adds up all of outputs respectively of the N delay units, and generates multiplexed spread spectrum pulse position modulated signal.

2. The spread spectrum transmission apparatus according to claim 1, comprising: N phase shift units which respectively shift output phases respectively of the N delay units respectively by determined phase shift quantities and output the phase-shifted signals to the multiplexing unit.

3. A spread spectrum reception apparatus comprising:
   a matched filter which conducts correlation computation between a received signal and a pseudonoise code sequence and outputs a result of the computation as a correlation signal, one frame of the received signal being formed of M+L−1 chips determined by the pseudonoise code sequence having a period of L chips and M chips which represents a number of pulse position information pieces corresponding to an information content to be transmitted;
   a frame synchronization unit which outputs a reproduced frame clock synchronized to start timing of the frame based on the correlation signal;
   N (where N is an integer of 2 or greater) delay correction units which conduct delay correction so as to align start timing of the frames with respect to the correlation signal output by said matched filter; and
   N pulse position demodulation units which conduct pulse position demodulation by using N delay-corrected correlation signals output respectively by the N delay correction units and the reproduced frame clock, and output parallel demodulated data sequences each having K bits.

4. The spread spectrum reception apparatus according to claim 3, comprising:
   N phase correction units which are provided on an input side of the N delay correction units, and which conduct phase correction so as to align carrier phases of correlation signals output by said matched filter, and output resultant signals to the N delay correction units; or
   N phase correction units which are provided on an output side of the N delay correction units, and which conduct phase correction so as to align carrier phases of correlation signals aligned with frame start timing by the N delay correction units, and output resultant signals to the N pulse position demodulation units.

5. A spread spectrum communication system comprising:
   a spread spectrum transmission apparatus comprising:
   a chip clock generation unit which outputs a chip clock having a clock rate corresponding to a chip rate in one frame formed of M+L−1 chips, the M+L−1 being determined by a pseudonoise code sequence having a period of L chip and M chips which represents a number of pulse position information pieces corresponding to an information content to be transmitted,
   a frame clock generation unit which conducts frequency division on the chip clock output by the chip clock generation unit by a factor of M+L−1, and outputs a frame clock synchronized to frame occurrence timing,
   N (where N is an integer of 2 or greater) spread spectrum pulse position modulated signal generation units each of which inserts the pseudonoise code sequence corresponding to one period from some of the M chips located at a head of a frame based on K-bit (where K is an integer of 2 or greater) transmission data by taking a rising edge of the frame clock output by the frame clock generation unit as a reference, and generates a spread spectrum pulse position modulated signal, N delay units which delay outputs respectively of the N spread spectrum pulse position modulated signal generation units by determined delay quantities $\{\tau_1 T_c, \tau_2 T_c, \tau_3 T_c, \ldots, \tau_N T_c\}$ (where delay factors $\{\tau_1, \tau_2, \tau_3, \ldots, \tau_N\}$ are integers which satisfy $0 \leq \tau_1, \tau_2, \tau_3, \ldots, \tau_N < L$, and $T^c$ is a chip period), and a multiplexing unit which adds up all of outputs respectively of the N delay units, and generates multiplexed spread spectrum pulse position modulated signal which conducts delay processing on a frame formed of M+L−1 chips, multiplexes N (where N is an integer of 2 or greater) spread spectrum pulse position modulated signals, and transmits resultant multiplexed signal, the M+L−1 being determined by pseudonoise code sequence having a period of L chips and M chips which represents a number of pulse position information pieces corresponding to an information content to be transmitted; and a spread spectrum reception apparatus comprising:

a matched filter which conducts correlation computation between a received signal and a pseudonoise code sequence and outputs a result of the computation as a correlation signal, one frame of the received signal being formed of M+L−1 chips determined by the pseudonoise code sequence having a period of L chips and M chips which represents a number of pulse position information pieces corresponding to an information content to be transmitted, a frame synchronization unit which outputs a reproduced frame clock synchronized to start timing of the frame based on the correlation signal, N (where N is an integer of 2 or greater) delay correction units which conduct delay correction so as to align start timing of the frames with respect to the correlation signal output by said matched filter, and N pulse position demodulation units which conduct pulse position demodulation by using N delay-corrected correlation signals output respectively by the N delay correction units and the reproduced frame clock, and output parallel demodulated data sequences each having K bits which conducts delay correction processing on the multiplexed spread spectrum pulse position modulated signals received by using a pseudonoise code sequence identical to the pseudonoise code sequence used in said spread spectrum transmission apparatus, and conducts demodulation processing.

6. The spread spectrum communication system according to claim 5, wherein in the N delay units in said spread spectrum transmission apparatus, the delay factors $\{\tau_1, \tau_2, \tau_3, \ldots, \tau_N\}$ are set so as to always satisfy $|\tau_x - \tau_y| \geq M$ for arbitrary $x \in [1, 2, \ldots, N]$ and $y \in [1, 2, \ldots, N]$ which satisfy $x \neq y$, and said matched filter in said spread spectrum reception apparatus generates a pulsative correlation signal for one arbitrary chip subjected to pulse position modulation and included in M chips located at a frame head section.

7. The spread spectrum communication system according to claim 5, wherein the frame synchronization unit in said spread spectrum reception apparatus is formed so as to conduct frame synchronization by detecting a peak value of correlation signal generated with determined timing every frame period in one or more channels, in spread spectrum pulse position modulated signals of N channels received from said spread spectrum transmission apparatus.

8. A spread spectrum communication system comprising:

a spread spectrum transmission apparatus comprising:

a chip clock generation unit which outputs a chip clock having a clock rate corresponding to a chip rate in one frame formed of M+L−1 chips, the M+L−1 being determined by a pseudonoise code sequence having a period of L chips and M chips which represents a number of pulse position information pieces corresponding to an information content to be transmitted, a frame clock generation unit which conducts frequency division on the chip clock output by the chip clock generation unit with a factor of M+L−1, and outputs a frame clock synchronized to frame occurrence timing, N (where N is an integer of 2 or greater) spread spectrum pulse position modulated signal generation units each of which inserts the pseudonoise code sequence corresponding to one period from some of the M chips located at a head of a frame based on K-bit (where K is an integer of 2 or greater) transmission data by taking a rising edge of the frame clock output by the frame clock generation unit as a reference, and generates a spread spectrum pulse position modulated signal, N delay units which delay outputs respectively of the N spread spectrum pulse position modulated signal generation units by determined delay quantities $\{\tau_1 T_c, \tau_2 T_c, \tau_3 T_c, \ldots, \tau_N T_c\}$ (where delay factors $\{\tau_1, \tau_2, \tau_3, \ldots, \tau_N\}$ are integers which satisfy $0 \leq \tau_1, \tau_2, \tau_3, \ldots, \tau_N < L$, and $T_c$ is a chip period), and a multiplexing unit which adds up all of outputs respectively of the N delay units, and generates a multiplexed spread spectrum pulse position modulated signal comprising, N phase shift units which respectively shift output phases respectively of the N delay units respectively by determined phase shift quantities and output the phase-shifted signals to the multiplexing unit which conducts delay processing and phase shift processing on a frame formed of M+L−1 chips, multiplexes N (where N is an integer of 2 or greater) spread spectrum pulse position modulated signals, and transmits resultant multiplexed signal, the M+L−1 being determined by pseudonoise code sequence having a period of L chips and M chips which represents a number of pulse position information pieces corresponding to an information content to be transmitted; and a spread spectrum reception apparatus comprising:

a matched filter which conducts correlation computation between a received signal and a pseudonoise code sequence and outputs a result of the computation as a correlation signal, one frame of the received signal being formed of M+L−1 chips determined by the pseudonoise code sequence having a period of L chips and M chips which represents a number of pulse position information pieces corresponding to an information content to be transmitted;

a frame synchronization unit which outputs a reproduced frame clock synchronized to start timing of the frame based on the correlation signal, N (where N is an integer of 2 or greater) delay correction units which conduct delay correction so as to align start timing of the frames with respect to the correlation signal output by said matched filter, N pulse position demodulation units which conduct pulse position demodulation by using N delay-corrected correlation signals output respectively by the N delay correction units and the reproduced frame clock, and output parallel demodulated data sequences each having K bits, and either:

N phase correction units which are provided on an input side of the N delay correction units, and which conduct phase correction so as to align carrier phases of correlation signals output by said matched filter, and output resultant signals to the N delay correction units, or N phase correction units which are provided on an output side of the N delay correction units, and which conduct phase correction so as to align carrier phases of correlation signals aligned with frame start timing by the N delay correction units, and output resultant signals to the N pulse position demodulation units which conducts delay correction processing and phase correction processing on the multiplexed spread spectrum pulse position modulated signals received by using a pseudonoise code sequence identical to the pseudonoise code sequence used in said spread spectrum transmission apparatus, and conducts demodulation processing.

9. The spread spectrum communication system according to claim 8, wherein in the N delay units in said spread spectrum transmission apparatus, the delay factors $\{\tau_1, \tau_2, \tau_3, \ldots, \tau_N\}$ are set so as to always satisfy $|\tau_x - \tau_y| \geq M$ for arbitrary $x \in [1, 2, \ldots, N]$ and $y \in [1, 2, \ldots, N]$ which satisfy $x \neq y$, and said matched filter in said spread spectrum reception apparatus generates a pulsative correlation signal for one arbitrary chip subjected to pulse position modulation and included in M chips located at a frame head section.

10. The spread spectrum communication system according to claim 8, wherein the frame synchronization unit in said spread spectrum reception apparatus is formed so as to conduct frame synchronization by detecting a peak value of a correlation signal generated with determined timing every frame period in one or more channels, in spread spectrum pulse position modulated signals of N channels received from said spread spectrum transmission apparatus.

* * * * *